(12) United States Patent
Ly et al.

(10) Patent No.: US 11,368,956 B2
(45) Date of Patent: Jun. 21, 2022

(54) RADIO LINK MANAGEMENT UNDER BANDWIDTH PART SWITCHING

(71) Applicant: QUALCOMM Incorporated, San Diego, CA (US)

(72) Inventors: Hung Dinh Ly, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/375,674

(22) Filed: Apr. 4, 2019

(65) Prior Publication Data
US 2019/0313411 A1    Oct. 10, 2019

Related U.S. Application Data

(60) Provisional application No. 62/653,270, filed on Apr. 5, 2018.

(51) Int. Cl.
*H04W 4/00* (2018.01)
*H04W 72/04* (2009.01)
*H04L 5/00* (2006.01)

(52) U.S. Cl.
CPC ....... *H04W 72/0453* (2013.01); *H04L 5/0048* (2013.01)

(58) Field of Classification Search
CPC ......... H04W 72/0453; H04W 56/0015; H04W 76/19; H04W 24/08; H04W 72/042; H04W 28/18; H04W 76/15; H04W 24/10; H04W 36/0088; H04W 36/06; H04W 36/165; H04W 48/12; H04W 72/0426; H04W 72/10; H04W 74/0808; H04W 76/27; H04W 84/047; H04L 5/0048; H04L 5/0023; H04L 5/0053; H04L 5/00; H04L 5/0051;
(Continued)

(56) References Cited

U.S. PATENT DOCUMENTS

| | | | |
|---|---|---|---|
| 9,673,945 B2 * | 6/2017 | Geirhofer | H04L 5/0048 |
| 9,936,411 B2 * | 4/2018 | Kim | H04W 56/001 |
| 10,880,949 B2 * | 12/2020 | Zhou | H04W 16/04 |

(Continued)

FOREIGN PATENT DOCUMENTS

| | | | | |
|---|---|---|---|---|
| EP | 3780770 A1 * | 2/2021 | | H04W 36/0005 |
| EP | 3836677 A1 * | 6/2021 | | H04L 27/26025 |
| IN | 201741031876 A * | 3/2019 | | H04J 11/00 |

OTHER PUBLICATIONS

3GPP TSG RAN WG1 Meeting #92, R1-1802138, Remaining Details on NR RLM, Feb. 26-Mar. 2, 2018, pp. 1-3 (Year: 2018).*
(Continued)

*Primary Examiner* — Phuongchau Ba Nguyen
(74) *Attorney, Agent, or Firm* — Harrity & Harrity, LLP (57) ABSTRACT

Various aspects of the present disclosure generally relate to wireless communication. In some aspects, a user equipment (UE) may determine that the UE is to switch from a first active bandwidth part to a second active bandwidth part; determine a configuration for a second reference signal of the second active bandwidth part based at least in part on a configuration for a first reference signal of the first active bandwidth part; and receive the second reference signal based at least in part on the configuration for the second reference signal. Numerous other aspects are provided.

30 Claims, 7 Drawing Sheets

(58) Field of Classification Search
CPC ... H04L 1/0693; H04L 5/0039; H04L 5/0046; H04L 5/005; H04L 5/0092; H04B 17/318
See application file for complete search history.

(56) References Cited

U.S. PATENT DOCUMENTS

| | | | | |
|---|---|---|---|---|
| 11,140,675 | B2* | 10/2021 | Liao | H04W 72/044 |
| 2018/0192426 | A1* | 7/2018 | Ryoo | H04W 72/085 |
| 2019/0132862 | A1* | 5/2019 | Jeon | H04L 5/0064 |
| 2019/0141546 | A1* | 5/2019 | Zhou | H04W 72/0453 |
| 2019/0141695 | A1* | 5/2019 | Babaei | H04L 5/0048 |
| 2019/0149305 | A1* | 5/2019 | Zhou | H04L 1/0026 370/330 |
| 2019/0182000 | A1* | 6/2019 | Futaki | H04L 5/0039 |
| 2019/0222290 | A1* | 7/2019 | Ly | H04L 5/0048 |
| 2019/0253904 | A1* | 8/2019 | Tsai | H04L 5/0094 |
| 2019/0289513 | A1* | 9/2019 | Jeon | H04W 72/0453 |
| 2020/0007292 | A1* | 1/2020 | Huang | H04L 5/0094 |
| 2020/0154299 | A1* | 5/2020 | Shi | H04W 24/10 |
| 2020/0296656 | A1* | 9/2020 | Amuru | H04L 1/1896 |
| 2021/0111960 | A1* | 4/2021 | Ly | H04L 41/0896 |
| 2021/0188780 | A1* | 6/2021 | Kaneko | C07D 231/12 |
| 2021/0298038 | A1* | 9/2021 | Kang | H04W 72/1268 |

OTHER PUBLICATIONS

Lin et al, A Primer on Bandwidth Parts in 5G New Radio, 2018, Mediatek, pp. 1-15. (Year: 2018).*

Mediatek, Bandwidth Part Adaptation, 2019, 5G NR User Experience and Power Consumption Enhancements, pp. 1-15 (Year: 2019).*

"3rd Generation Partnership Project; Technical Specification Group Radio Access Network; NR; Medium Access Control (MAC) protocol specification (Release 15)", Technical Specification; 3GPP TS 38.321, vol. RAN WG2. No. V15.0.0, Jan. 4, 2018 (Jan. 4, 2018), pp. 1-55, XP051392362.

"3rd Generation Partnership Project; Technical Specification Group Radio Access Network; NR; NR and NG-RAN Overall Description; Stage 2 (Release 15)", 3GPP Draft; 38.300-F10, Mar. 28, 2018 (Mar. 28, 2018), XP051414454, 72 Pages, Retrieved from the Internet: URL:http://www.3gpp.org/ftp/tsg%5Fran/WG2%5FRL2/Specifications/201803%5Fdraft%5Fspecs%5Fafter%5FRAN%5F79 . . . [retrieved on Mar. 28, 2018].

"3rd Generation Partnership Project; Technical Specification Group Radio Access Network; NR; Physical channels and modulation (Release 15)", 3GPP Standard; TS 38.211, vol. RAN WG1, No. V15.0.0, Jan. 3, 2018 (Jan. 3, 2018), pp. 1-73, XP051392260.

"3rd Generation Partnership Project; Technical Specification Group Radio Access Network; NR; Physical layer procedures for control (Release 15)," 3GPP Standard; Technical Specification; 3GPP TS 38.213, 3rd Generation Partnership Project (3GPP), Mobile Competence Centre; 650, Route Des Lucioles; F-06921 Sophia-Antipolis Cedex; France, vol. RAN WG1, No. V15.0.0, Jan. 3, 2018 (Jan. 3, 2018), pp. 1-56, XP051392263, [retrieved on Jan. 3, 2018].

Ericsson: "BWP and RLM in NR", 3GPP Draft; R2-1800593—BWP and RLM in NR, vol. RAN WG2. No. Vancouver, Canada; Jan. 22, 2018-Jan. 26, 2018, Jan. 12, 2018 (Jan. 12, 2018), XP051386243, 4 Pages, Retrieved from the Internet: URL:http://www.3gpp.org/ftp/tsg%5Fran/WG2%5FRL2/TSGR2%5FAHs/2018%5F01%5FNR/Docs/ [retrieved on Jan. 12, 2018], p. 2, paragraph 3—p. 4.

Ericsson: "BWP impact to RLM configuration (E396)", 3GPP Draft; R2-1802780—BWP Impact to RLM (E396), vol. RAN WG2, No. Athens, Greece; Feb. 26, 2018-Mar. 2, 2018, Feb. 21, 2018 (Feb. 21, 2018), XP051400786, 4 Pages, Retrieved from the Internet: URL:http://www.3gpp.org/ftp/tsg%5Fran/WG2%5FRL2/TSGR2%5F101/Docs/ [retrieved or Feb. 21, 2018], p. 1, paragraph 2-3—p. 4.

International Search Report and Written Opinion—PCT/US2019/026129—ISA/EPO—dated Jul. 26, 2019.

OPPO: "Remaining details on NR RLM", 3GPP Draft; R1-1802138, vol. RAN WG1, No. Athens, Greece; Feb. 26, 2018-Mar. 2, 2018, Feb. 15, 2018 (Feb. 15, 2018), XP051396870, 3 Pages, Retrieved from the Internet: URL:http://www.3gpp.org/ftp/tsg%5Fran/WG1%5FRL1/TSGR1%5F92/Docs/ [retrieved on Feb. 15, 2018], p. 1. paragraph 2—p. 2, figure 1.

* cited by examiner

RADIO LINK MANAGEMENT UNDER BANDWIDTH PART SWITCHING

CROSS-REFERENCE TO RELATED APPLICATIONS UNDER 35 U.S.C. § 119

This application claims priority to U.S. Provisional Patent Application No. 62/653,270, filed on Apr. 5, 2018, entitled "TECHNIQUES AND APPARATUSES FOR RADIO LINK MANAGEMENT UNDER BANDWIDTH PART SWITCHING," which is hereby expressly incorporated by reference herein.

FIELD OF THE DISCLOSURE

Aspects of the present disclosure generally relate to wireless communication, and more particularly to techniques and apparatuses for radio link management (RLM) for bandwidth part (BWP) switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that the UE is to switch from a first active bandwidth part to a second active bandwidth part; determining a configuration for a second reference signal of the second active bandwidth part based at least in part on a configuration for a first reference signal of the first active bandwidth part; and receiving the second reference signal based at least in part on the configuration for the second reference signal.

In some aspects, a UE for wireless communication may include memory and one or more processors operatively coupled to the memory. The memory and the one or more processors may be configured to determine that the UE is to switch from a first active bandwidth part to a second active bandwidth part; determine a configuration for a second reference signal of the second active bandwidth part based at least in part on a configuration for a first reference signal of the first active bandwidth part; and receive the second reference signal based at least in part on the configuration for the second reference signal.

In some aspects, a non-transitory computer-readable medium may store one or more instructions for wireless communication. The one or more instructions, when executed by one or more processors of a UE, may cause the one or more processors to determine that the UE is to switch from a first active bandwidth part to a second active bandwidth part; determine a configuration for a second reference signal of the second active bandwidth part based at least in part on a configuration for a first reference signal of the first active bandwidth part; and receive the second reference signal based at least in part on the configuration for the second reference signal.

In some aspects, an apparatus for wireless communication may include means for determining that the apparatus is to switch from a first active bandwidth part to a second active bandwidth part; means for determining a configuration for a second reference signal of the second active bandwidth part based at least in part on a configuration for a first reference signal of the first active bandwidth part; and means for receiving the second reference signal based at least in part on the configuration for the second reference signal.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
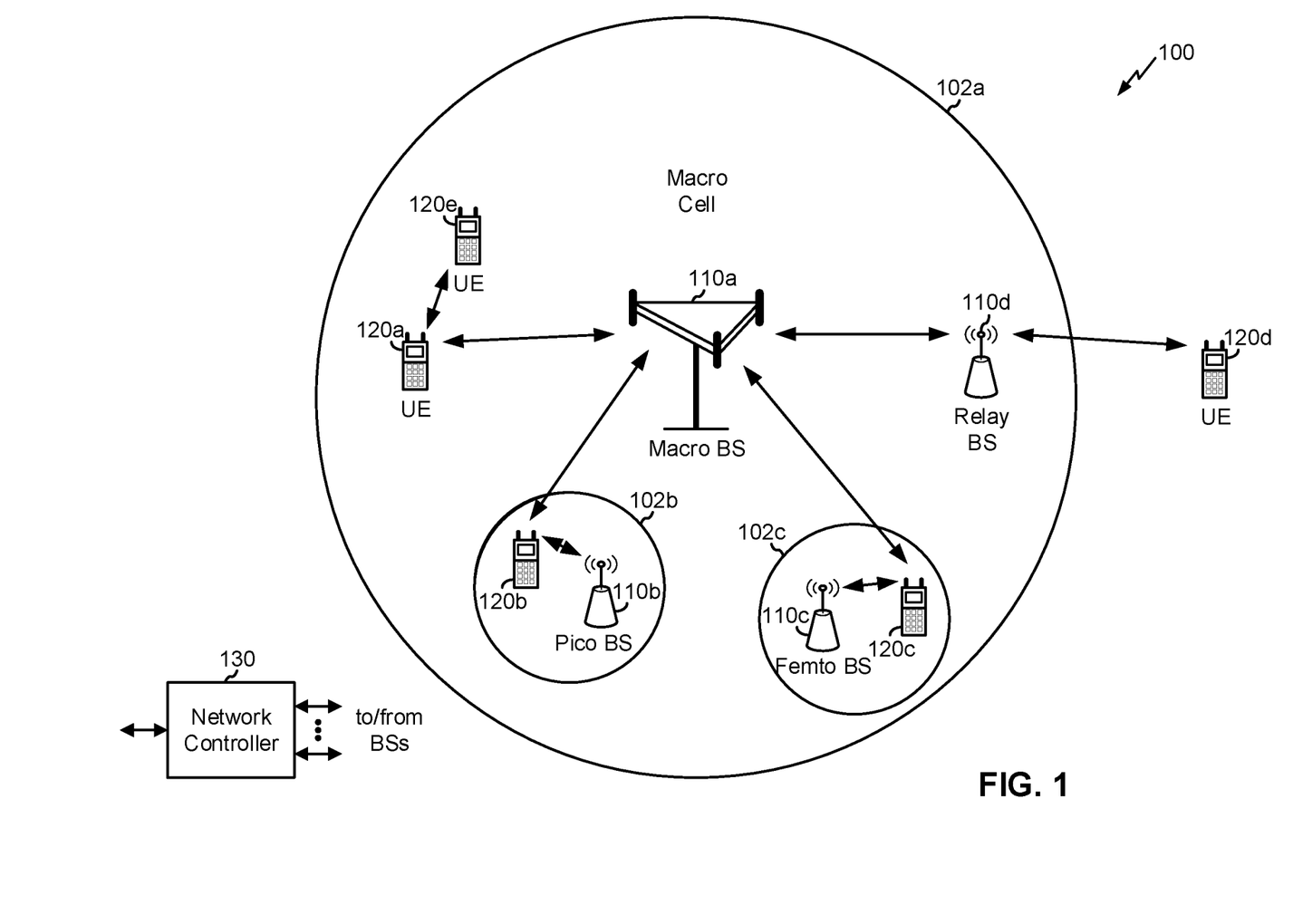
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter, a sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
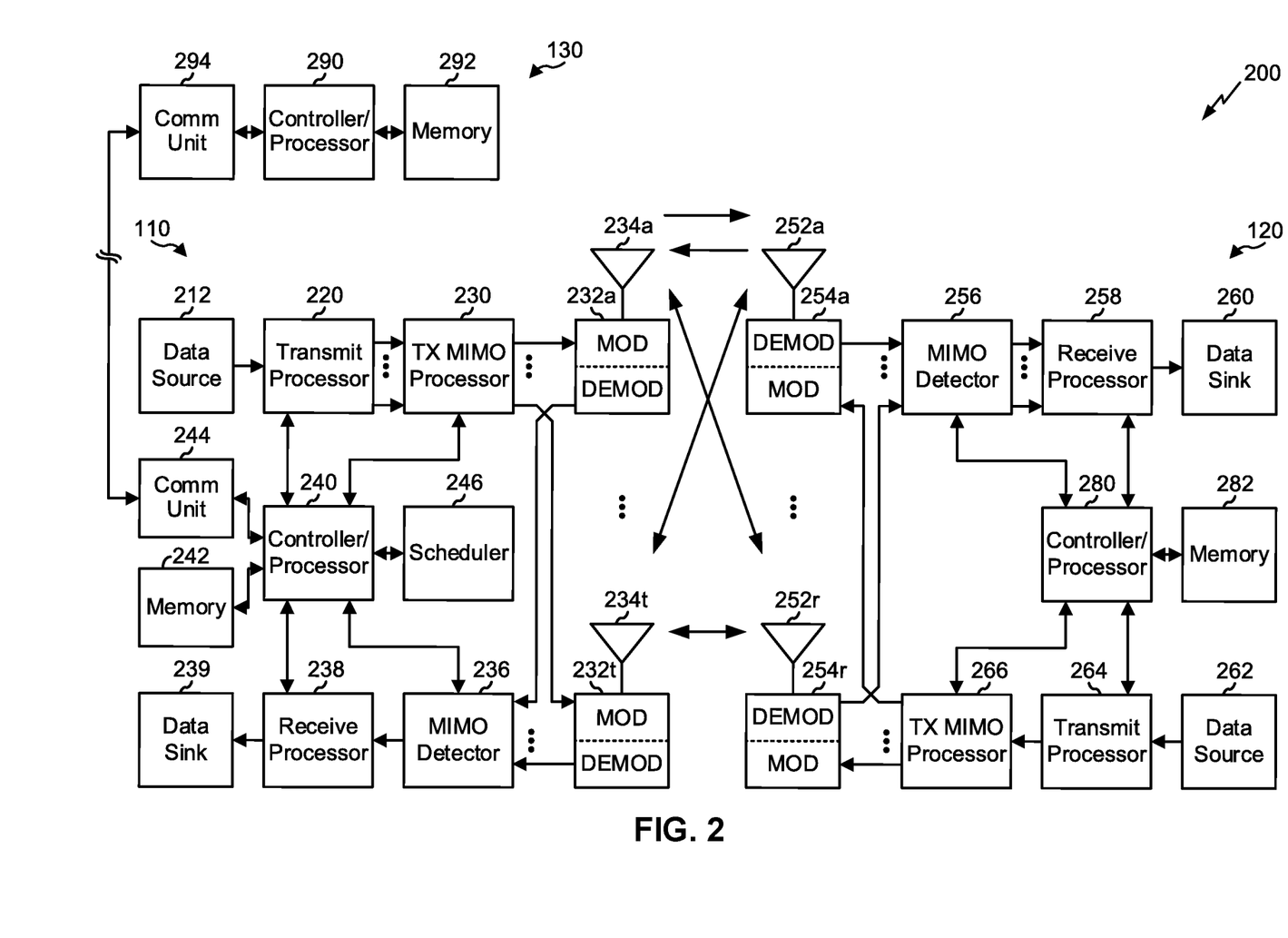
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with RLM for BWP switching, as described in more detail elsewhere herein. For example, controller/processor 240 of BS 110, controller/processor 280 of UE 120, and/or any other component(s) of FIG. 2 may perform or direct operations of, for example, process 600 of FIG. 6 and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for determining that the UE is to switch from a first active bandwidth part to a second active bandwidth part, means for determining a configuration for a second reference signal of the second active bandwidth part based at least in part on a configuration for a first reference signal of the first active bandwidth part, means for receiving the second reference signal based at least in part on the configuration for the second reference signal, means for determining a numerology of the second reference signal as a numerology of the second active bandwidth part, and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
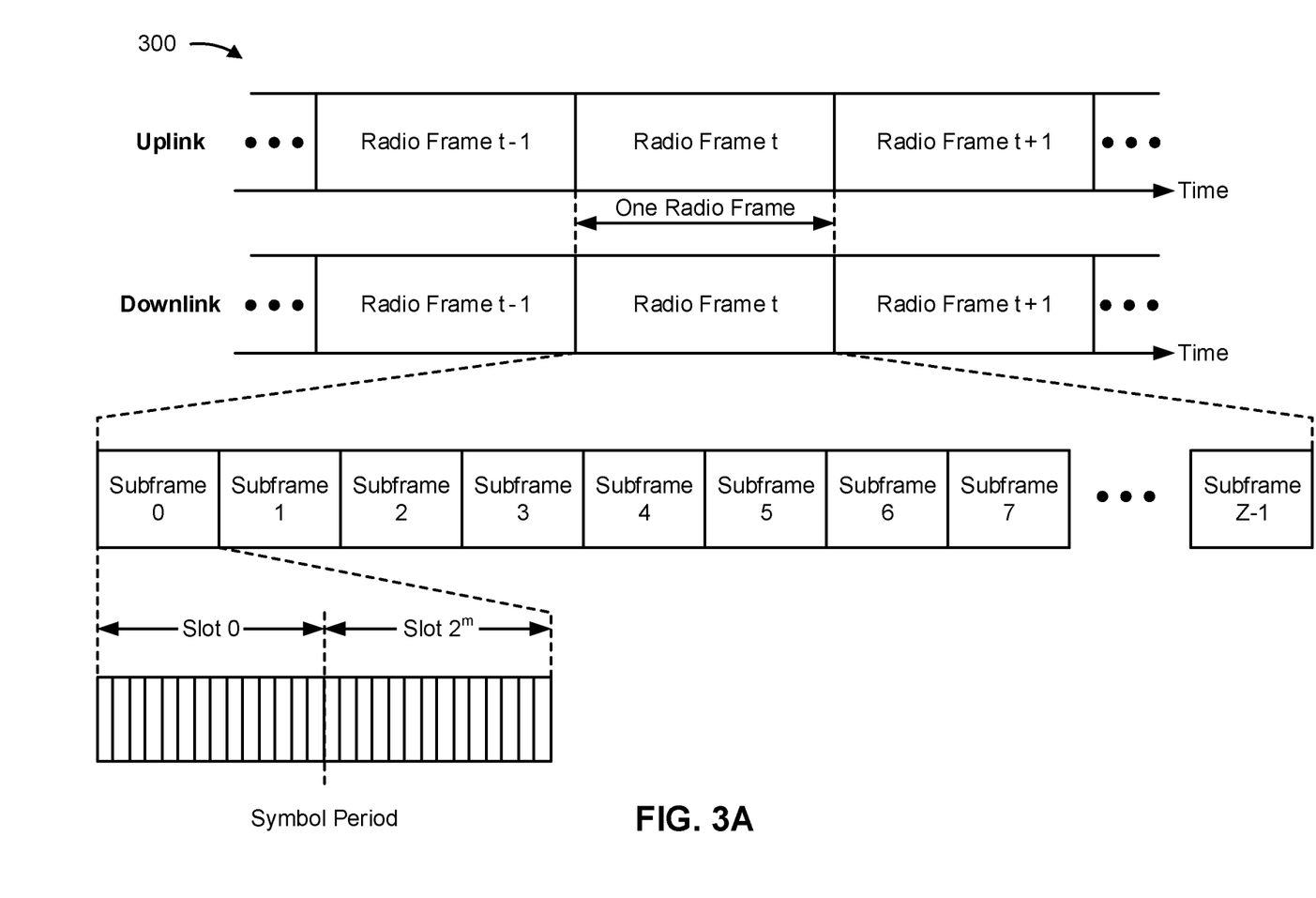
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
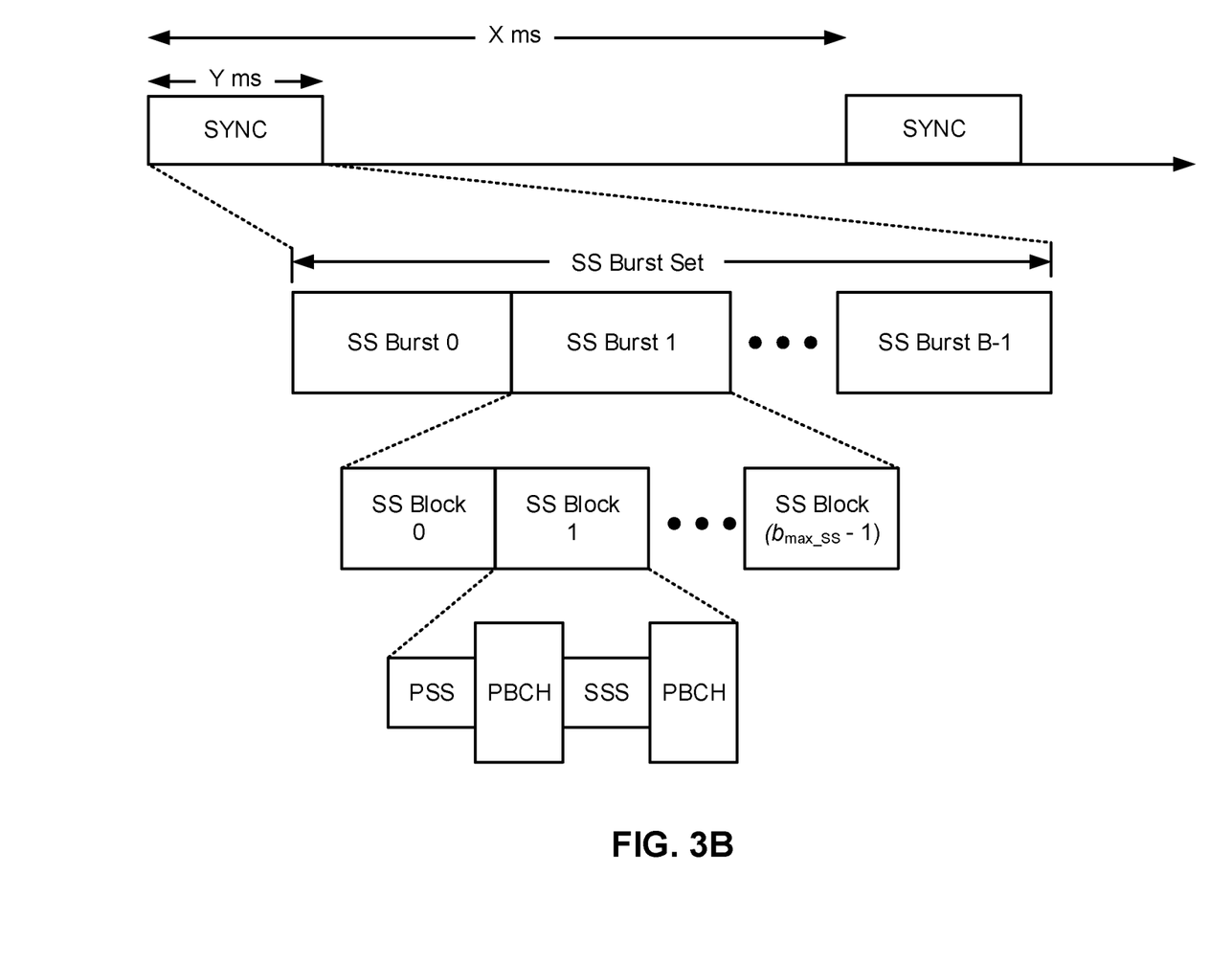
FIG. 3B is a block diagram conceptually illustrating an example synchronization communication hierarchy in a wireless communication network, in accordance with various aspects of the present disclosure.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
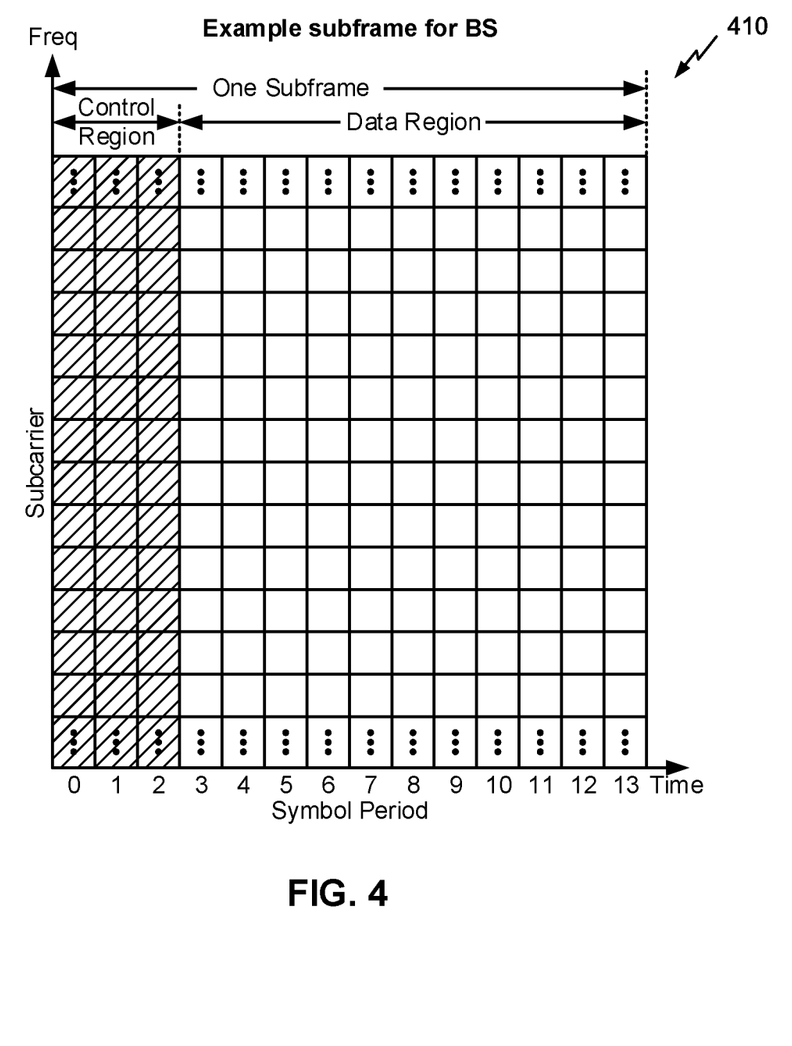
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Radio link management (RLM) is a procedure for determining whether a radio link between a UE and a BS has failed. When the radio link has failed, the UE may provide an indication that the UE is out-of-sync (OOS) with the BS. When the radio link has not failed, the UE may determine and/or provide an indication that the UE is in-sync (IS) with the BS. RLM may be performed based at least in part on an RLM reference signal (RLM-RS). For example, the BS may transmit the RLM-RS using a configuration known to the BS and the UE, and the UE may determine whether the UE is IS or OOS using the RLM-RS.

In 5G/New Radio (5G/NR), the RLM-RS can include a synchronization signal block (SSB) and/or a channel state information reference signal (CSI-RS). 5G/NR may support RLM on a primary cell (PCell) of the UE and a primary secondary cell (PSCell) of the UE. Up to X RLM-RSs can be configured for the UE at a time (e.g., using radio resource control (RRC) signaling). For example, X may be 2 for sub-3 GHz bands, 4 for 3-6 GHz bands, 8 for super-6 GHz bands, and/or the like. The UE may determine a hypothetical physical downlink control channel (PDCCH) block error rate (BLER) based at least in part on a signal to interference plus noise (SINR) metric of the RLM-RS. The UE may indicate IS if the estimated link quality (e.g., the hypothetical PDCCH BLER) of at least one RLM-RS resource satisfies a threshold (e.g., a q_in threshold). The UE may indicate OOS if the estimated link qualities of all RLM-RS resources of the UE fail to satisfy a threshold (e.g., a q_out threshold).

In 5G/NR, a UE may use multiple bandwidth parts (BWPs) in the connected mode. One or more configured downlink BWPs may be active, and may be referred to herein as active downlink BWPs. The UE may not be required to perform RLM-RS measurement outside of the UE's active downlink BWPs. Furthermore, RLM configuration may be BWP-dependent. In the case wherein the UE is to switch from a first active DL BWP to a second active DL BWP, the UE may need to know the RLM-RS configuration for the second active DL BWP. However, signaling the configuration for the second active DL BWP may be time-consuming and may use radio resources.

Some techniques and apparatuses described herein provide for the UE to determine a configuration of an RLM-RS for a second active DL BWP based at least in part on a configuration of an RLM-RS for a first active DL BWP. For example, the UE may determine the configuration based at least in part on switching from the first active DL BWP to the second active DL BWP. However, the techniques and apparatuses described herein are not limited to those in which the UE is to switch from the first DL BWP to the second DL BWP. For example, the UE may perform the techniques described herein to determine an RLM-RS configuration for a second DL BWP irrespective of whether the UE is to switch to the second DL BWP. In this way, the UE determines the configuration for the RLM-RS of the second DL BWP without explicit signaling from a BS, which saves resources of the BS and reduces latency associated with switching active BWPs.

Figure 5:
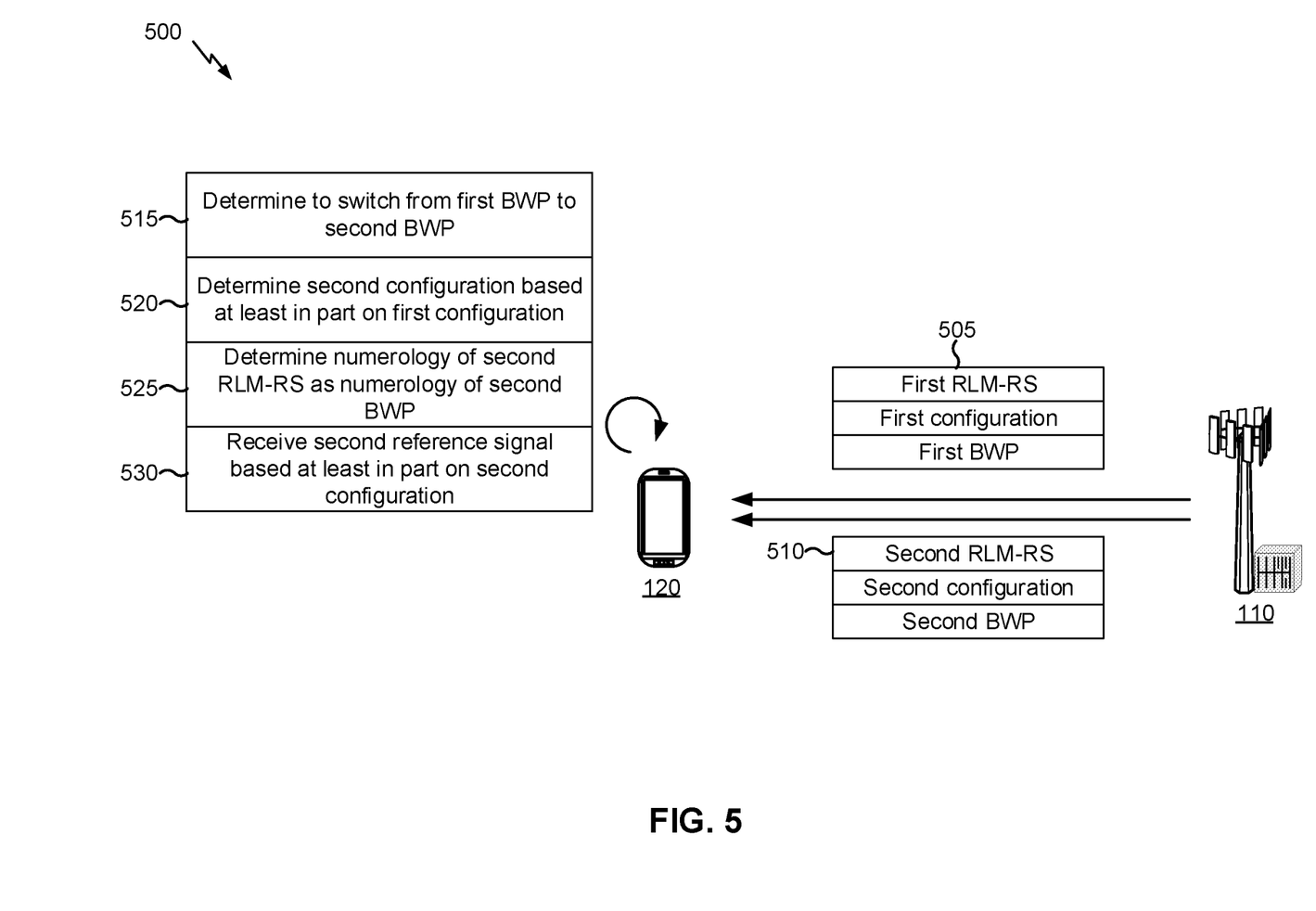
FIG. 5 is a diagram illustrating an example of radio link management (RLM) for bandwidth part (BWP) switching, in accordance with various aspects of the present disclosure.

FIG. 5 is a diagram illustrating an example 500 of radio link management (RLM) for bandwidth part (BWP) switching, in accordance with various aspects of the present disclosure. As shown in FIG. 5, and by reference number 505, a BS 110 may transmit a first RLM-RS. For example, the BS 110 may transmit the first RLM-RS based at least in part on a first configuration, and may transmit the first RLM-RS in a first BWP. The first RLM-RS may be used by UEs 120 with the first BWP as an active BWP to determine a radio link status on the first BWP. As shown by reference number 510, the BS 110 may transmit a second RLM-RS using a second configuration. For example, the BS 110 may transmit the second RLM-RS in a second BWP which may or may not overlap the first BWP. UEs 120 that are configured with the second BWP as an active BWP may determine a radio link status on the second BWP using the second RLM-RS. In some aspects, the first BWP and the second BWP may be the same BWP, or may at least partially overlap. In some aspects, the first BWP and the second BWP may not overlap and/or may be different BWPs.

In some aspects, the first RLM-RS and the second RLM-RS may be synchronization signal blocks (SSBs). In such a case, the first configuration may identify at least one of an SSB index of the first RLM-RS (sometimes referred to as an SSB/physical broadcast channel (SSB/PBCH) index), a frequency used to transmit the first RLM-RS, an SSB periodicity of the first RLM-RS, an SSB timing offset with respect to a reference timing (e.g., based at least in part on a subframe number), an SSB subcarrier spacing (SCS), and/or the like. In some aspects, the first RLM-RS and the second RLM-RS may be CSI-RSs. In such a case, the first configuration may identify at least one of a CSI-RS resource index, a CSI-RS periodicity, and/or the like. In some aspects, the BS 110 may provide the first configuration to the UE 120 using signaling, such as RRC signaling or a different type of signaling. In some aspects, the first configuration may be dependent on the first BWP and the second configuration may be dependent on the second BWP. In other words, the first configuration and the second configuration may be BWP-dependent.

As shown by reference number 515, the UE 120 may determine to switch from the first BWP to the second BWP. For example, the UE 120 may use the first BWP as an active BWP (e.g., an active DL BWP). The UE 120 may determine to switch to the second BWP as an active BWP (e.g., an active DL BWP). However, the techniques and apparatuses described herein are not limited to those in which the UE 120 is to switch from the first BWP to the second BWP. For example, the UE 120 may perform the operations described in connection with FIGS. 5 and 6 when the UE 120 is to activate the second BWP as an active BWP irrespective of whether the UE 120 is to deactivate the first BWP. In some aspects, the UE 120 may determine to switch from the first BWP to the second BWP based at least in part on an indication received from the BS 110. In some aspects, the UE 120 may determine to switch from the first BWP to the second BWP based at least in part on information associated with the first BWP or the second BWP (e.g., congestion, channel quality, and/or the like).

As shown by reference number 520, the UE 120 may determine the second configuration based at least in part on the first configuration. For example, when the first RLM-RS and the second RLM-RS are SSBs, the UE 120 may determine at least one of the SSB configuration parameters described above based at least in part on the first configuration of the first RLM-RS. When the first RLM-RS and the second RLM-RS are CSI-RSs, the UE 120 may determine at least one of the SSB configuration parameters described above based at least in part on the first RLM-RS.

In some aspects, the UE 120 may determine the configuration based at least in part on an SSB index or CSI-RS resource index of the first RLM-RS and/or the second RLM-RS. For example, when the first RLM-RS and the second RLM-RS are associated with a same SSB index or CSI-RS resource index, the UE 120 may determine the second configuration according to an assumption that the first RLM-RS and the second RLM-RS are quasi-co-located at least with respect to spatial parameters, or as if the first RLM-RS and the second RLM-RS are quasi-co-located at least with respect to spatial parameters. This can be performed for the first RLM-RS and the second RLM-RS irrespective of whether the first and second RLM-RSs are associated with the same BWP or different BWPs. In this way, the UE 120 may conserve resources that would otherwise be used to provide information indicating that the first RLM-RS and the second RLM-RS are quasi-co-located. Furthermore, the UE 120 may use the same receive beam to perform measurements for the first RLM-RS and the second RLM-RS.

In some aspects, the UE 120 may determine a periodicity of the second RLM-RS (e.g., an SSB periodicity or a CSI-RS periodicity) based at least in part on a periodicity of the first RLM-RS. For example, the UE 120 may determine the periodicity of the second RLM-RS as the periodicity of the first RLM-RS. This may conserve processor resources that would otherwise be used to determine a different periodicity. In some aspects, the periodicity of an SSB may be determined to be the same as an SSB periodicity that is signalled in remaining minimum system information (RMSI) for the purpose of rate matching. For example, the periodicity of the SSB may be equal to ssb-PeriodicityServingCell, as defined in 3GPP Technical Specification 38.331. In some aspects, the periodicity of an SSB may be explicitly signalled to the UE 120 as part of RLM-RS configuration. In some aspects, if the periodicity is not signaled or configured, the UE 120 may determine the SSB periodicity as the same as the SSB periodicity used in initial access (e.g., when the UE 120 gets access to the network).

In some aspects, the UE 120 may determine the periodicity of the second RLM-RS to be different than the periodicity of the first RLM-RS. For example, the UE 120 may apply a transformation to the periodicity of the first RLM-RS to determine the periodicity of the second RLM-RS, may determine the periodicity of the second RLM-RS based at least in part on the second BWP, may use configuration information for the second BWP to determine the periodicity of the second RLM-RS, and/or the like. This may provide increased flexibility for the periodicity of the second RLM-RS in comparison to using the same periodicity.

In some aspects, the UE 120 may determine a timing offset of the second RLM-RS (e.g., an SSB timing offset) based at least in part on a timing offset of the first RLM-RS. For example, the UE 120 may determine the timing offset of the second RLM-RS as the timing offset of the first RLM-RS. This may conserve processor resources that would otherwise be used to determine a different timing offset. In some aspects, the UE 120 may determine the timing offset of the second RLM-RS to be different than the timing offset of the first RLM-RS. For example, the UE 120 may apply a transformation to the timing offset of the first RLM-RS to determine the timing offset of the second RLM-RS, may use configuration information for the second BWP to determine the timing offset of the second RLM-RS, and/or the like. This may provide increased flexibility for the timing offset of the second RLM-RS in comparison to using the same timing offset.

In some aspects, the UE 120 may determine an SCS of the second RLM-RS (e.g., an SSB SCS) based at least in part on an SCS of the first RLM-RS. For example, the UE 120 may determine the SCS of the second RLM-RS as the SCS of the first RLM-RS. Furthermore, when the SSB is used as an RLM-RS, the SSB SCS in the configured DL BWPs may be the same as the SCS of the SSB used for the initial access. This may conserve processor resources that would otherwise be used to determine a different SCS. In some aspects, the UE 120 may determine the SCS of the second RLM-RS to be different than the SCS of the first RLM-RS. For example, the UE 120 may apply a transformation to the SCS of the first RLM-RS to determine the SCS of the second RLM-RS, may use a multiple of the first SCS to determine the second SCS (e.g., 30 kHz for the first SCS and 15 kHz for the second SCS, etc.), and/or the like. This may provide increased flexibility for the SCS of the second RLM-RS in comparison to using the same SCS.

As shown by reference number 525, in some aspects, the UE 120 may determine a numerology of the second RLM-RS as the numerology of the second BWP. For example, when the first RLM-RS and the second RLM-RS are CSI-RSs, the UE 120 may determine the numerology of the second RLM-RS to be equal to the numerology of the active BWP (e.g., the second BWP). This may conserve radio resources that would otherwise be used to signal the numerology of the second RLM-RS.

As shown by reference number 530, the UE 120 may receive the second reference signal based at least in part on the second configuration. In some aspects, the UE 120 may perform RLM based at least in part on the second configuration. For example, the UE 120 may monitor particular resources according to the second configuration. In some aspects, the UE 120 may determine a metric based at least in part on the second RLM-RS. For example, the UE 120 may determine an SINR of the second RLM-RS and/or may determine a hypothetical PDCCH BLER based at least in part on the second RLM-RS. In some aspects, the UE 120 may provide an indication of whether the UE 120 is IS or OOS based at least in part on the second RLM-RS. For example, in some aspects, the indication of whether the UE 120 is IS or OOS may be based at least in part on the first RLM-RS and the second RLM-RS (e.g., in connection with one or more other RLM-RSs or only the first RLM-RS and the second RLM-RS). In this way, the UE 120 may perform RLM based at least in part on a second configuration that is derived from a first configuration of the first RLM-RS. This reduces signaling required to configure the UE 120 and improves latency of switching BWPs.

In some aspects, multiple SSBs may be transmitted in a DL BWP. In such a case, when one of the multiple SSBs is used for radio resource management (RRM), the SSB used for RRM may be reused for RLM. This may reduce UE complexity in monitoring SSB for both RRM and RLM.

As indicated above, FIG. 5 is provided as an example. Other examples may differ from what is described with respect to FIG. 5.

Figure 6:
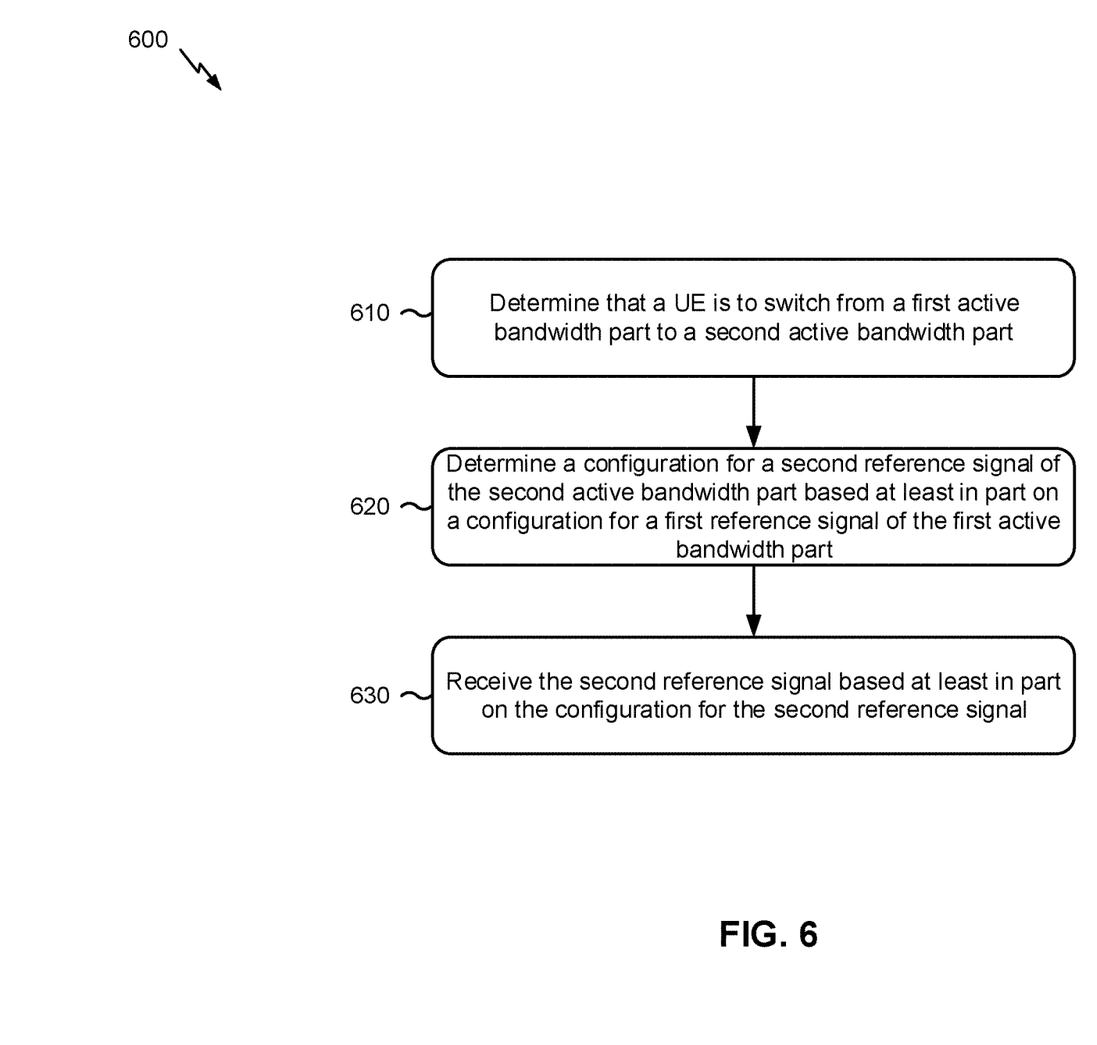
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs RLM under BWP switching.

As shown in FIG. 6, in some aspects, process 600 may include determining that the UE is to switch from a first active bandwidth part to a second active bandwidth part (block 610). For example, the UE (e.g., using controller/processor 280 and/or the like) may determine that the UE is to switch from a first active BWP to a second active BWP. In some aspects, the UE may determine that the UE is to determine a configuration for the second active BWP based at least in part on a configuration for the first active BWP.

As shown in FIG. 6, in some aspects, process 600 may include determining a configuration for a second reference signal of the second active bandwidth part based at least in part on a configuration for a first reference signal of the first active bandwidth part (block 620). For example, the UE (e.g., using controller/processor 280 and/or the like) may determine a configuration for a second reference signal (e.g., a CSI-RS, an SSB, an RLM-RS, and/or the like) based at least in part on a configuration for a first reference signal (e.g., a CSI-RS, an SSB, an RLM-RS, and/or the like). In some aspects, the configuration for the first reference signal and the configuration for the second reference signal may at least partially match. In some aspects, the configuration for the first reference signal may be different that the configuration for the second reference signal. In some aspects, the configuration for the first reference signal may be based at least in part on the first active bandwidth part. For example, the configuration for the first reference signal may be BWP-dependent.

As shown in FIG. 6, in some aspects, process 600 may include receiving the second reference signal based at least in part on the configuration for the second reference signal (block 630). For example, the UE (e.g., using antenna 252, DEMOD 254, MIMO detector 256, receive processor 258, controller/processor 280, and/or the like) may receive the second reference signal based at least in part on the configuration for the second reference signal. In some aspects, the UE may perform RLM based at least in part on the second reference signal. For example, the UE may provide an indicator associated with RLM based at least in part on at least one of the first reference signal, the second reference signal, and/or one or more other reference signals.

Process 600 may include additional aspects, such as any single aspect or any combination of aspects described below and/or in connection with one or more other processes described elsewhere herein.

In a first aspect, the first reference signal and the second reference signal are for radio link monitoring. In a second aspect, alone or in combination with the first aspect, the first reference signal and the second reference signal are synchronization signal blocks. In a third aspect, alone or in combination with any one or more of the first or second aspects, the configuration for the first reference signal is based at least in part on radio resource control (RRC) signaling that identifies at least one of: a synchronization signal block index, a frequency at which the first reference signal is received, a periodicity of the first reference signal, a timing offset of the first reference signal, or a subcarrier spacing of the first reference signal.

In a fourth aspect, alone or in combination with any one or more of the first through third aspects, the first reference signal and the second reference signal are channel state information reference signals. In a fifth aspect, alone or in combination with any one or more of the first through fourth aspects, the configuration for the first reference signal is based at least in part on radio resource control (RRC) signaling that identifies at least one of: a resource index of the first reference signal, or a periodicity of the first reference signal.

In a sixth aspect, alone or in combination with any one or more of the first through fifth aspects, the configuration for the second reference signal is determined as if the first reference signal and the second reference signal are quasi-co-located with regard to at least a spatial parameter. In a seventh aspect, alone or in combination with any one or more of the first through sixth aspects, the configuration for the second reference signal is determined as if the first reference signal and the second reference signal are associated with at least one of: a same periodicity, or a same timing offset. In an eighth aspect, alone or in combination with any one or more of the first through seventh aspects, the UE may determine the configuration for the second reference signal is based at least in part on determining a numerology of the second reference signal as a numerology of the second active bandwidth part. In a ninth aspect, alone or in combination with any one or more of the first through eighth aspects, the UE may determine a numerology of the second reference signal as a numerology of the second active bandwidth part. In a tenth aspect, alone or in combination with any one or more of the first through ninth aspects, the configuration for the second reference signal is determined as if the first reference signal and the second reference signal are associated with a same subcarrier spacing or numerology.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), the method comprising:
   receiving a configuration for a first reference signal of a first active bandwidth part;
   determining a configuration for a second reference signal of a second bandwidth part without receiving the configuration for the second reference signal based at least in part on the configuration for the first reference signal of the first active bandwidth part, wherein the configuration for the second reference signal is determined as if the first reference signal and the second reference signal are quasi-co-located with regard to at least a spatial parameter, and wherein the second bandwidth part is deactivated and to be activated irrespective of whether the first active bandwidth part is deactivated; and
   receiving the second reference signal based at least in part on the configuration for the second reference signal.

2. The method of claim 1, wherein the first reference signal and the second reference signal are for radio link monitoring.

3. The method of claim 1, wherein the configuration for the first reference signal is based at least in part on radio resource control (RRC) signaling that identifies at least one of:
   a frequency at which the first reference signal is received,
   a periodicity of the first reference signal,
   a timing off set of the first reference signal, or
   a subcarrier spacing of the first reference signal.

4. The method of claim 1, wherein the first reference signal and the second reference signal are channel state information reference signals.

5. The method of claim 4, wherein the configuration for the first reference signal is based at least in part on radio resource control (RRC) signaling that identifies at least one of:
a resource index of the first reference signal, or
a periodicity of the first reference signal.

6. The method of claim 1, wherein the configuration for the second reference signal is determined as if the first reference signal and the second reference signal are associated with at least one of:
a same periodicity, or
a same timing offset.

7. The method of claim 1, wherein the configuration for the second reference signal is determined as if the first reference signal and the second reference signal are associated with a same subcarrier spacing or numerology.

8. The method of claim 1, further comprising:
determining a numerology of the second reference signal as a numerology of the second bandwidth part.

9. The method of claim 1, wherein the first reference signal is a first channel state information reference signal (CSI-RS) and the second reference signal is a second CSI-RS, and wherein a numerology of the second CSI-RS is equal to a numerology of the second bandwidth part.

10. A user equipment (UE) for wireless communication, comprising:
a memory; and
one or more processors coupled to the memory, the one or more processors configured to:
receive a configuration for a first reference signal of a first active bandwidth part;
determine a configuration for a second reference signal of a second bandwidth part without receiving the configuration for the second reference signal based at least in part on the configuration for the first reference signal of the first active bandwidth part, wherein the configuration for the second reference signal is determined as if the first reference signal and the second reference signal are quasi-co-located with regard to at least a spatial parameter, and wherein the second bandwidth part is deactivated and to be activated irrespective of whether the first active bandwidth part is deactivated; and
receive the second reference signal based at least in part on the configuration for the second reference signal.

11. The UE of claim 10, wherein the first reference signal and the second reference signal are for radio link monitoring.

12. The UE of claim 10, wherein the configuration for the first reference signal is based at least in part on radio resource control (RRC) signaling that identifies at least one of:
a frequency at which the first reference signal is received,
a periodicity of the first reference signal,
a timing off set of the first reference signal, or
a subcarrier spacing of the first reference signal.

13. The UE of claim 10, wherein the first reference signal and the second reference signal are channel state information reference signals.

14. The UE of claim 13, wherein the configuration for the first reference signal is based at least in part on radio resource control (RRC) signaling that identifies at least one of:
a resource index of the first reference signal, or
a periodicity of the first reference signal.

15. The UE of claim 10, wherein the configuration for the second reference signal is determined as if the first reference signal and the second reference signal are associated with at least one of:
a same periodicity, or
a same timing offset.

16. The UE of claim 10, wherein the configuration for the second reference signal is determined as if the first reference signal and the second reference signal are associated with a same subcarrier spacing or numerology.

17. The UE of claim 10, wherein the one or more processors are further configured to:
determine a numerology of the second reference signal as a numerology of the second bandwidth part.

18. The UE of claim 10, wherein the first reference signal is a first channel state information reference signal (CSI-RS) and the second reference signal is a second CSI-RS, and wherein a numerology of the second CSI-RS is equal to a numerology of the second bandwidth part.

19. The UE of claim 11, wherein the first reference signal is a first channel state information reference signal (CSI-RS) and the second reference signal is a second CSI-RS, and wherein the configuration for the second CSI-RS is determined as if the first CSI-RS and the second CSI-RS are associated with a same periodicity.

20. The UE of claim 10, wherein the first reference signal is a first channel state information reference signal (CSI-RS) and the second reference signal is a second CSI-RS, and wherein the configuration for the second CSI-RS is determined as if the first CSI-RS and the second CSI-RS are associated with a different periodicity.

21. A non-transitory computer-readable medium storing one or more instructions for wireless communication, the one or more instructions comprising:
one or more instructions that, when executed by one or more processors of a user equipment (UE), cause the one or more processors to:
receive a configuration for a first reference signal of a first active bandwidth part;
determine a configuration for a second reference signal of a second bandwidth part without receiving the configuration for the second reference signal based at least in part on the configuration for the first reference signal of the first active bandwidth part, wherein the configuration for the second reference signal is determined as if the first reference signal and the second reference signal are quasi-co-located with regard to at least a spatial parameter, and wherein the second bandwidth part is deactivated and to be activated irrespective of whether the first active bandwidth part is deactivated; and
receive the second reference signal based at least in part on the configuration for the second reference signal.

22. The non-transitory computer-readable medium of claim 21, wherein the first reference signal and the second reference signal are for radio link monitoring.

23. The non-transitory computer-readable medium of claim 21, wherein the configuration for the first reference signal is based at least in part on radio resource control (RRC) signaling that identifies at least one of:
a frequency at which the first reference signal is received,
a periodicity of the first reference signal,
a timing off set of the first reference signal, or
a subcarrier spacing of the first reference signal.

24. The non-transitory computer-readable medium of claim 21, wherein the first reference signal is a first channel state information reference signal (CSI-RS) and the second reference signal is a second CSI-RS, and wherein a numerology of the second CSI-RS is equal to a numerology of the second bandwidth part.

25. An apparatus for wireless communication, comprising:
  means for receiving a configuration for a first reference signal of a first active bandwidth part;
  means for determining a configuration for a second reference signal of a second bandwidth part without receiving the configuration for the second reference signal based at least in part on the configuration for the first reference signal of the first active bandwidth part, wherein the configuration for the second reference signal is determined as if the first reference signal and the second reference signal are quasi-co-located with regard to at least a spatial parameter, and wherein the second bandwidth part is deactivated and to be activated irrespective of whether the first active bandwidth part is deactivated; and
  means for receiving the second reference signal based at least in part on the configuration for the second reference signal.

26. The apparatus of claim 25, wherein the first reference signal and the second reference signal are for radio link monitoring.

27. The apparatus of claim 25, wherein the configuration for the first reference signal is based at least in part on radio resource control (RRC) signaling that identifies at least one of:
  a frequency at which the first reference signal is received,
  a periodicity of the first reference signal,
  a timing off set of the first reference signal, or
  a subcarrier spacing of the first reference signal.

28. The apparatus of claim 25, wherein the first reference signal and the second reference signal are channel state information reference signals.

29. The apparatus of claim 28, wherein the configuration for the first reference signal is based at least in part on radio resource control (RRC) signaling that identifies at least one of:
  a resource index of the first reference signal, or
  a periodicity of the first reference signal.

30. The apparatus of claim 25, wherein the first reference signal is a first channel state information reference signal (CSI-RS) and the second reference signal is a second CSI-RS, and wherein a numerology of the second CSI-RS is equal to a numerology of the second bandwidth part.

* * * * *